UNITED STATES PATENT OFFICE.

EMIL GÜNTHER AND RUDOLF FRANKE, OF EISLEBEN, GERMANY.

METHOD OF EXTRACTING METALLIC ORES AND MATTE.

No. 875,259.  Specification of Letters Patent.  Patented Dec. 31, 1907.

Application filed June 18, 1907. Serial No. 379,536.

*To all whom it may concern:*

Be it known that we, EMIL GÜNTHER and RUDOLF FRANKE, residents of Eisleben, Germany, have invented certain new and useful Improvements in Methods of Extracting Metallic Ores and Matte, of which the following is a specification.

The invention is directed more particularly to the treatment of copper and nickel ores and to matte produced from such ores and aims at the production of pure copper and pure nickel.

The nickel ores which at present are available for the production of nickel are substantially garnierite and nickel and copper containing magnetic pyrites. In order to produce pure nickel and pure copper from said ores or from ores of similar composition the ores are, in a preferred form of carrying out the invention, smelted together in suitable furnaces so as to form matte or concentrated nickel or nickel copper regulus. On smelting together the two kinds of ores the magnetic pyrites afford the sulfur for converting the garnierite into regulus, whereas the garnierite affords the silicic-acid for converting the excess of bases contained in the pyrites into slag. By employing suitable proportions of garnierite and pyrite it becomes possible to convert the ores into regulus without addition of further substances. However it may be advantageous to add ores of precious metals, this being a way to obtain the precious metals from said ores in a very economical manner. In the production of the concentrated copper nickel regulus it is important to take care that the iron which may be contained in the ores is converted into slag as far as possible.

The concentrated copper nickel regulus is subjected to electrolytic action, the regulus being used as anode in a bath of sulfate of copper with free sulfuric acid; the cathode being formed of a sheet of copper. At the anode iron copper and nickel are dissolved; the precious metals, sulfur, silicic acid, small portions of metallic sulfid etc. form the constituents of the solid residue of the anode or of the anode slime. The anode slime is washed out and dried and treated with a suitable solvent for the sulfur. The residue, after extraction of the sulfur, may further be treated for recovering the precious constituents. In a preferred form of treating the said residue of the anode slime the residue is slightly roasted so as to obtain the metals copper, nickel, iron etc. substantially in the form of oxid and the silver in the form of sulfate.

After roasting the residue is treated with the spent electrolyte of the electrolysis of sulfate of copper with the effect that the free sulfuric acid is neutralized and the oxids converted into sulfates. The insoluble remaining portion containing metallic silver, gold, small portions of sulfids, sand etc. is then treated by any of the well known methods to extract the precious metals. The sulfate containing solution is treated with copper tailings with the effect that the silver contained therein is deposited. The other metals are separated by fractionated crystallization and chemical deposition. It is advisable to eliminate the last traces of copper by nickel sponge. One obtains a technically pure sulfate of copper and nickel sulfate free of copper.

At the negative pole pure copper is deposited. In view of the fact that more copper is deposited at the cathode than dissolved at the anode, it is necessary to continuously or intermittently introduce copper sulfate into the electrolyzing vat. Such copper sulfate is partly obtained by the above described treatment of anode slime; the additional quantity required may be manufactured from copper pyrite.

During the progress of electrolysis the electrolyte becomes more and more rich in nickel. When a desired degree of concentration in nickel salt is reached the electrolyte is drawn off and fresh copper sulfate solution introduced into the vats.

That portion of the spent electrolyte which is not used for treating the anode slime is treated in the following manner: The copper is extracted by evaporation, crystallization and subsequent electrolysis with insoluble anodes with exception of a small proportion. The remaining liquid containing nickel sulfate, much free sulfuric acid, a small portion of iron salts and other impurities is neutralized with suboxid of nickel (NiO); the impurities are chemically eliminated. A solution of pure sulfate of nickel is obtained. The suboxid of nickel which is required for neutralizing the said solution is obtained in known manner by roasting of concentrated nickel regulus.

The solution of pure sulfate of nickel is electrolyzed with insoluble anodes. At the cathode pure nickel is deposited, at the anode $SO_4$ is formed which changes into $H_2SO_4$. It is advisable to insure circulation of the electrolyte and to neutralize any excess of acid outside the electrolytic tank by suboxid of nickel, sodium lye, milk of lime or similar substances. The products of neutralization may be used in any convenient manner.

Although we prefer to combine the different forms of nickel ores, such as garnierite and nickel and copper containing magnetic pyrites in forming anodes for electrolytically extracting the metals contained therein, we can also use concentrated nickel regulus produced from one sort of ore alone and proceed in the manner hereinbefore described.

Having now described our invention, what we claim and desire to secure by Letters Patent is:

1. The method of extracting metals from ores and matte consisting in subjecting copper and nickel containing matte or concentrated copper nickel regulus to electrolytic action as anode in an electrolytic bath containing sulfate of copper containing free sulfuric acid, roasting the formed anode slime, treating the roasted slime with spent electrolyte of said electrolytic process and using the solution obtained in this way as electrolyte in an electrolytic process with copper nickel regulus anodes.

2. The method of extracting metals from ores consisting in smelting together garnierite and nickel and copper containing magnetic pyrites so as to form concentrated copper nickel regulus, subjecting said copper nickel regulus to electrolytic action as anode in an electrolytic bath containing copper sulfate and free sulfuric acid, roasting the formed anode slime, treating the roasted product with spent electrolyte of such electrolytic process using the solution obtained in this way as electrolyte in an electrolytic process with copper nickel regulus anodes, purifying the electrolyte when rich in nickel from copper, the last portions of copper and other impurities being thrown down by suboxid of nickel containing substances and electrolyzing the resulting solution of pure sulfate of nickel with insoluble anodes.

In witness whereof we have hereunto set our hands in the presence of two witnesses.

EMIL GÜNTHER.
RUDOLF FRANKE.

Witnesses:
VILMA FRANKE,
RUDOLPH FRICKE.